(12) United States Patent  
Hineno

(10) Patent No.: US 7,675,833 B2
(45) Date of Patent: Mar. 9, 2010

(54) OPTICAL PICKUP WITH BEAM GENERATING AND FOCUSSING

(75) Inventor: Satoshi Hineno, Kanagawa (JP)

(73) Assignee: Sony Corporation, Tokyo (JP)

( * ) Notice: Subject to any disclaimer, the term of this patent is extended or adjusted under 35 U.S.C. 154(b) by 436 days.

(21) Appl. No.: 11/732,448

(22) Filed: Apr. 3, 2007

(65) Prior Publication Data

US 2007/0237056 A1 Oct. 11, 2007

(30) Foreign Application Priority Data

Apr. 10, 2006 (JP) .............................. 2006-107952

(51) Int. Cl.
*G11B 7/00* (2006.01)
(52) U.S. Cl. .............................. 369/112.01; 369/112.24; 369/121
(58) Field of Classification Search ...................... None
See application file for complete search history.

(56) References Cited

U.S. PATENT DOCUMENTS

| 6,650,612 | B1* | 11/2003 | Matsuzaki et al. ..... | 369/112.05 |
| 7,206,275 | B2* | 4/2007 | Saitoh et al. ........... | 369/112.05 |
| 2004/0032815 | A1* | 2/2004 | Kim et al. ............... | 369/112.26 |
| 2005/0047313 | A1* | 3/2005 | Saitoh et al. ........... | 369/112.05 |
| 2005/0122883 | A1* | 6/2005 | Kimura .................. | 369/112.05 |
| 2005/0180295 | A1* | 8/2005 | Mimori .................. | 369/112.07 |
| 2005/0237898 | A1* | 10/2005 | Kimura .................. | 369/112.05 |
| 2006/0158990 | A1* | 7/2006 | Hineno .................... | 369/112.1 |
| 2006/0209655 | A1* | 9/2006 | Hibino .................... | 369/53.28 |
| 2009/0080321 | A1* | 3/2009 | Kimura et al. ......... | 369/112.23 |
| 2009/0190450 | A1* | 7/2009 | Kimura et al. ........... | 369/44.32 |

FOREIGN PATENT DOCUMENTS

JP 2003-177226 A 6/2003

* cited by examiner

*Primary Examiner*—Paul Huber
(74) *Attorney, Agent, or Firm*—Wolf, Greenfield & Sacks, P.C.

(57) ABSTRACT

An optical disk apparatus includes an optical pickup and a disk-rotation driving unit configured to rotationally drive the optical disks. The optical pickup includes a first emission unit configured to emit a first wavelength beam; a second emission unit configured to emit a second wavelength beam; a third emission unit configured to emit a third wavelength beam; an objective lens configured to focus the first to third wavelength beams emitted from the first to third emission units, respectively, at a signal recording surface of an optical disk; a light-path combining unit configured to combine an optical path of the first wavelength beam emitted from the first emission unit and an optical path of the second and third wavelength beams emitted from the second and third emission units, respectively; and an aberration correcting unit provided on the optical path of the second and third wavelength beams.

5 Claims, 7 Drawing Sheets

OPTICAL PICKUP WITH BEAM GENERATING AND FOCUSSING

CROSS REFERENCES TO RELATED APPLICATIONS

The present invention contains subject matter related to Japanese Patent Application JP 2006-107952 filed in the Japanese Patent Office on Apr. 10, 2006, the entire contents of which are incorporated herein by reference.

BACKGROUND OF THE INVENTION

1. Field of the Invention

The present invention relates to an optical pickup and an optical disk apparatus including an optical pickup that are capable of recording and replaying information signals using one objective lens for three different types of disk recording medium.

2. Description of the Related Art

As next-generation optical disk format, a known optical disk capable of high-density recording (hereinafter referred to as a high-density recording optical disk) in which recording and replay of a signal is carried out using an optical beam having a wavelength of approximately 405 nm generated by a blue-violet semiconductor laser has been proposed. As such a high-density recording optical disk, a disk having a thin protective substrate layer for protecting the signal recording layer of, for example, 0.1 mm has been proposed.

To provide an optical pickup supporting these high-density recording optical disks, it is desirable a provide an optical pickup that has compatibility with optical disks having different formats, such as a known compact disk (CD) having a usable wavelength of approximately 785 nm and a protective substrate layer with a thickness of approximately 1.2 mm or a digital versatile disc (DVD) having a usable wavelength of approximately 660 nm and a protective substrate layer with a thickness of approximately 0.6 mm. In this way, an optical pickup and an optical disk apparatus having compatibility with optical disks having different formats with different disk structures and different laser specifications are in need.

As a known method of recording and replaying an information signal for optical disks having three different types of format, a method of switching among objective lenses included in an optical pickup having a plurality of optical systems corresponding to the usable wavelengths has been proposed.

However, to provide various different optical systems requires a mechanism for switching among various different objective lenses and requires various different components including actuators. Therefore, the overall size of the apparatus is great, and the structure of the apparatus becomes complex.

To simplify the structure, an optical pickup may employ a common optical path and common optical components for all wavelengths. To provide such an optical pickup, the optical path must be the same for all wavelengths and the common objective lens must not generate aberration by optical beams having different wavelengths and different disk thicknesses have to be provided.

With such an optical pickup, when a working distance of at least 0.3 mm is provided for each optical disk, such as a CD having a great usable wavelength and a thick protective substrate layer, the aperture for a high-density recording optical disk having a small usable wavelength and a thin protective substrate layer increases to approximately 4 mm, and the objective lens becomes large and heavy. Therefore, the tracking ability is reduced, and the size of other optical components increases together with the increase in the aperture. Thus, there is a problem in that the overall size of the apparatus increases.

To avoid this problem, an optical beam of a CD or a DVD may be diverged with an optical element and be incident on an objective lens. However, due a reduction in the light intensity caused by the diffraction efficiency and transmittance of the optical element, it has been extremely difficult to carry out excellent recording and replay for an optical disk using three different wavelengths.

For a known optical pickup, for example, refer to Japanese Unexamined Patent Application Publication No. 2003-177226.

SUMMARY OF THE INVENTION

An optical pickup and an optical disk apparatus according to an embodiment of the present invention uses the same objective lens corresponding to three different wavelengths and can maintain a predetermined working distance and prevent a reduction in the light intensity. In this way, the optical pickup and the optical disk apparatus carry out excellent recording and replay.

An optical pickup according to an embodiment of the present invention includes a first emission unit configured to emit a first wavelength beam; a second emission unit configured to emit a second wavelength beam; a third emission unit configured to emit a third wavelength beam; an objective lens configured to focus the first to third wavelength beams emitted from the first to third emission units, respectively, at a signal recording surface of an optical disk; a light-path combining unit configured to combine an optical path of the first wavelength beam emitted from the first emission unit and an optical path of the second and third wavelength beams emitted from the second and third emission units, respectively; and an aberration correcting unit provided on the optical path of the second and third wavelength beams.

An optical disk apparatus according to an embodiment of the present invention includes an optical pickup configured to record and replay information on a plurality of optical disks, the optical disks having protective substrate layers for protecting recording surfaces, the protective substrate layers having different thicknesses; and a disk-rotation driving unit configured to rotationally drive the optical disks. The optical pickup includes a first emission unit configured to emit a first wavelength beam; a second emission unit configured to emit a second wavelength beam; a third emission unit configured to emit a third wavelength beam; an objective lens configured to focus the first to third wavelength beams emitted from the first to third emission units, respectively, at a signal recording surface of an optical disk; a light-path combining unit configured to combine an optical path of the first wavelength beam emitted from the first emission unit and an optical path of the second and third wavelength beams emitted from the second and third emission units, respectively; and an aberration correcting unit provided on the optical path of the second and third wavelength beams.

An optical pickup and an optical disk apparatus according to an embodiment of the present invention uses the same objective lens corresponding to three different wavelengths and can maintain a predetermined working distance and prevent a reduction in the light intensity. In this way, the optical pickup and the optical disk apparatus carry out excellent recording and replay on a plurality of different types of optical disks having three different usable wavelengths.

DESCRIPTION OF THE PREFERRED EMBODIMENTS

An optical disk apparatus employing an optical pickup according to an embodiment of the present invention will be described below with reference to the drawings.

Figure 1:
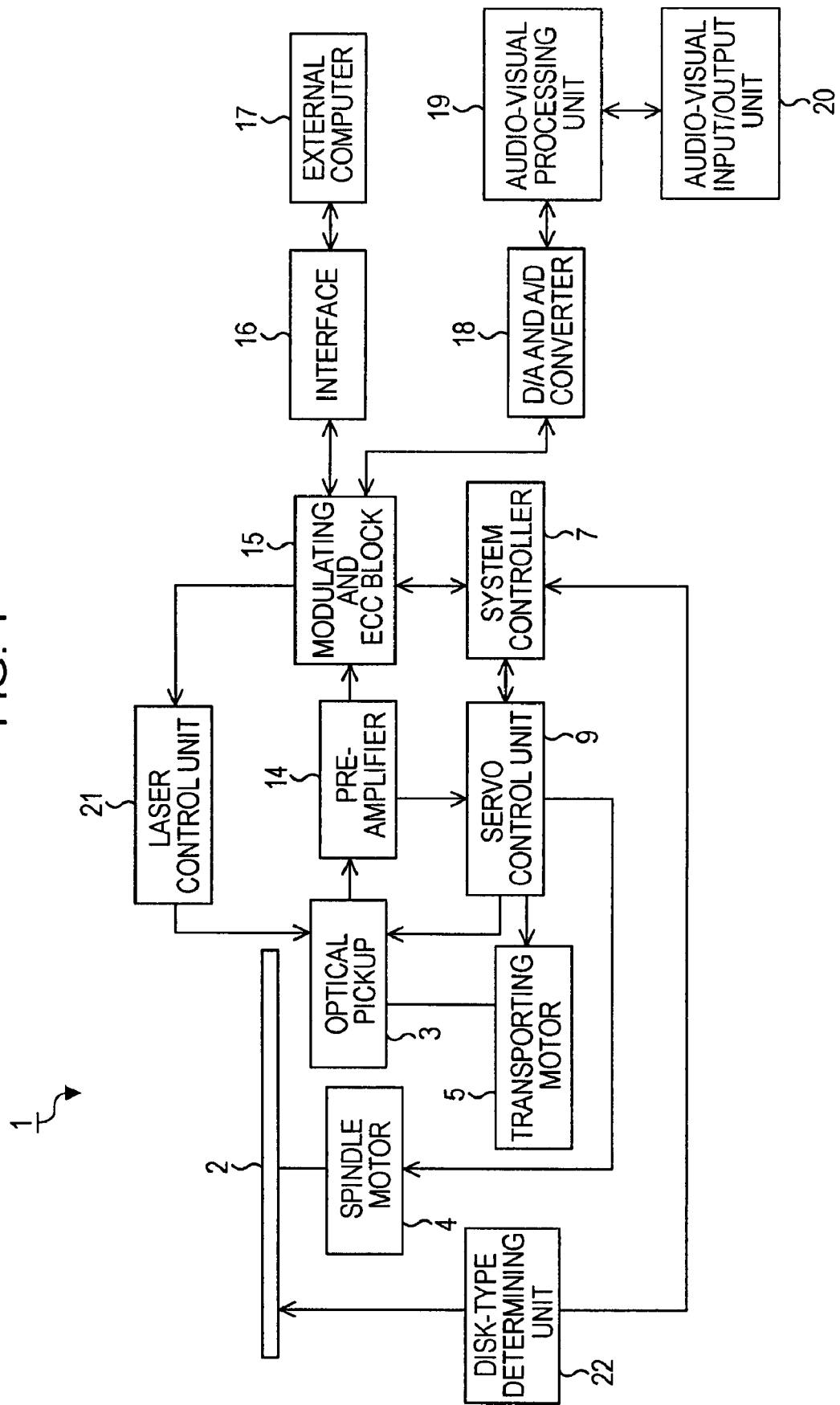
FIG. 1 is a block circuit diagram illustrating an optical disk apparatus according to an embodiment of the present invention.

As shown in FIG. 1, an optical disk apparatus 1 according to an embodiment of the present invention includes an optical pickup 3 that records and replays information on an optical disk 2, a spindle motor 4 that functions as a rotation-driving unit for rotating the optical disk 2, and a transporting motor 5 that moves the optical pickup 3 in the radial direction of the optical disk 2. The optical disk apparatus 1 supports three different standards for recording and/or replaying information on optical disks 2 having three different formats and optical disks having laminated recording layers.

The optical disk 2 used here are, for example, a compact disk (CD), a digital versatile disk (DVD), a CD-recordable (CD-R) and a DVD-recordable (DVD-R) that allow information to be added later, CD-rewritable (CD-RW), a DVD–rewritable (DVD–RW) and a DVD+rewritable (DVD+RW) that allow information to be rewritten, a high-density recording optical disk that allows high-density recording using a semiconductor laser having an emission wavelength of approximately 405 nm (blue-violet), and a magneto-optical disk.

In particular, as the three different types of optical disks 2 used by the optical disk apparatus 1 to carry out replay and recording, the following optical disks 2 are employed: a first optical disk 11 that has a protective substrate layer thickness $T_1$ of 0.1 mm and that allows high-density recording using an optical beam having a wavelength of approximately 405 nm as a recording and replay beam; a second optical disk 12, such as a DVD, that has a protective substrate layer thickness $T_2$ of 0.6 mm and that allows high-density recording using an optical beam having a wavelength of approximately 660 nm as a recording and replay beam; and a third optical disk 13, such as a CD, that has a protective substrate layer thickness $T_3$ of 1.2 mm and that allows high-density recording using an optical beam having a wavelength of approximately 785 nm as a recording and replay beam.

With the optical disk apparatus 1, the spindle motor 4 and the transporting motor 5 are drive-controlled in accordance with the type of the disk by a servo control unit 9 that is controlled on the basis of a command from a system controller 7 functioning as a disk-type determining unit. For example, the optical disk apparatus 1 is driven at a predetermined speed for each of the first optical disk 11, the second optical disk 12, and the third optical disk 13.

The optical pickup 3 includes a three-wavelength compatible optical system. The optical pickup 3 emits optical beams having different wavelengths to the recording layer of the optical disks conforming to different standards and detects the reflected optical beams from the recording layer. The optical pickup 3 generates a signal corresponding to each beam type of the detected reflected beam and supplies this signal to a pre-amplifier 14.

The output of the pre-amplifier 14 is sent to a signal modulating/demodulating and error-correction code block 15 (hereinafter referred to as the "modulating and ECC block 15"). The modulating and ECC block 15 modulates and demodulates a signal and adds an error-correction code (ECC) to the signal. The optical pickup 3 emits an optical beam to the recording layer of the optical disk 2 that rotates in accordance with a command from the modulating and ECC block 15 and records or replays a signal on the optical disk 2.

The pre-amplifier 14 generates signals, such as a focus-error signal, a tracking-error signal, and an RF signal, on the basis of a signal corresponding to the beam type of the detected optical beam depending to the format. Predetermined processing, such as demodulation and error correction, based on the standard of the optical disk 2 is carried out by the servo control unit 9 and the modulating and ECC block 15 in accordance with the type of the optical disk 2, which is the medium used for recording or replay.

For example, if the recording signal demodulated by the modulating and ECC block 15 is a data storage signal for a computer, the recording signal is sent to an external computer 17 via an interface 16. In this way, the external computer 17 can receive the signal recorded on the optical disk 2 as a replay signal.

If the recording signal demodulated by the modulating and ECC block 15 is an audio visual signal, digital-to-analog conversion is carried out on the signal by a D/A converting unit in a D/A and A/D converter 18. The converted signal is supplied to an audio-visual processing unit 19. Audio-visual processing is carried out on the signal at the audio-visual processing unit 19. Then, the signal is transmitted to an external image-capturing projector (not shown) via an audio-visual input/output unit 20.

At the optical pickup 3, the servo control unit 9 carries out, for example, control of the transporting motor 5 so as to move the optical pickup 3 to a predetermined recording track on the optical disk 2, control of the spindle motor 4, and driving control, in the focusing and tracking directions, of a two-axis actuator that holds the objective lens functioning as light-collecting unit of the optical pickup 3.

A laser control unit 21 controls the laser beam source of the optical pickup 3. In particular, in this embodiment, the laser control unit 21 controls the output power of the laser beam source in a manner such that the output powers differ in a recording mode and a replay mode. Furthermore, is the output power differs for each type of the optical disk 2. The laser control unit 21 switches the laser beam source of the optical pickup 3 in accordance with the type of the optical disk 2 detected by a disk-type determining unit 22.

The disk-type determining unit 22 detects different formats of the optical disk 2 on the basis of the differences in surface reflectance, shape, and external shape of the first to third optical disks 11 to 13.

Each of the blocks included in the optical disk apparatus 1 are capable of carrying out signal processing on the basis of the specification of the optical disk 2 installed in the optical disk apparatus 1 in accordance with the detected result of the disk-type determining unit 22.

The system controller 7 determines the type of the optical disk 2 on the basis of the detected result sent from the disk-type determining unit 22. If an optical disk is stored in a cartridge, to determining the type of the optical disk, a detection hole may be formed in the cartridge and a contact detection sensor or a pushing switch may be used. To determine the recording layers on the same optical disk, a recording layer to be used for recording or replay may be determined on the basis of the information included in a table of contents (TOC) recorded in the pre-mastered pit or groove formed at the inner circumference of the optical disk.

The servo control unit 9 determines the recording area to be used for recording or replay by detecting the relative position of, for example, the optical pickup 3 and the optical disk 2 (this includes a case in which the position is detected on the basis of an address signal recorded on the optical disk 2).

The optical disk apparatus 1 configured as described above records or replays information on the optical disk 2 by rotating the optical disk 2 with the spindle motor 4, driving the transporting motor 5 in accordance with the control signal from the servo control unit 9, and moving the optical pickup 3 to a position of a predetermined recording track on the optical disk 2.

Now, the above-described optical pickup 3 for recording and replay will be described in detail.

Figure 2:
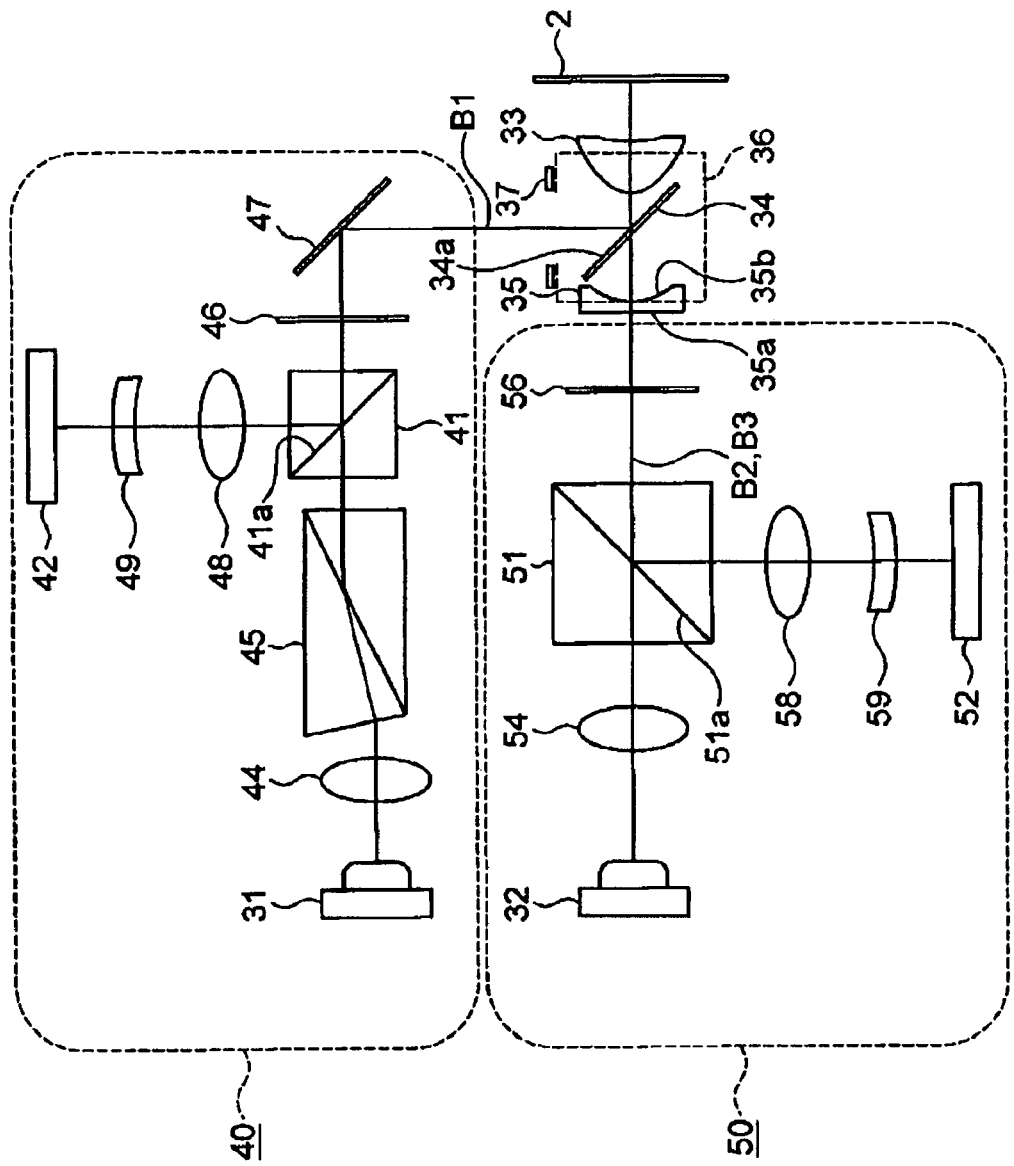
FIG. 2 illustrates optical paths of an optical disk apparatus according to an embodiment of the present invention.

As shown in FIG. 2, the optical pickup 3 according to this embodiment of the present invention includes a first light source unit 31 that has a first emission unit for emitting a first wavelength beam $B_1$; a second light source unit 32 that has a second emission unit for emitting a second wavelength beam $B_2$ and a third emission unit for emitting a third wavelength beam $B_3$; an objective lens 33 that focuses the beams emitted from the first to third emission units on the signal recording surface of the optical disk 2; an optical-path combining unit 34 that combines an optical path of the first wavelength beam $B_1$ emitted from the first emission unit and an optical path of the second and third wavelength beams $B_2$ and $B_3$ emitted from the second and third emission units, respectively; and an aberration correcting unit 35 that is provided on the optical path of the second and third wavelength beams $B_2$ and $B_3$.

The first emission unit of the first light source unit 31 emits the first wavelength beam $B_1$ having a wavelength of approximately 405 nm to the first optical disk 11; the second emission unit of the second light source unit 32 emits the second wavelength beam $B_2$ having a wavelength of approximately 660 nm to the second optical disk 12; and the third emission unit of the second light source unit 32 emits the third wavelength beam $B_3$ having a wavelength of approximately 785 nm to the third optical disk 13. Here, the second and third emission units are included in the same light source unit. Instead, however, the second and third emission units may be disposed at different positions and the optical paths may be combined using a beam splitter.

The optical-path combining unit 34 includes a wavelength-dependent optical element, such as a beam splitter. The optical-path combining unit 34 combines the optical path of the first wavelength beam $B_1$ emitted from the first emission unit and the optical path of the second and third wavelength beams $B_2$ and $B_3$ emitted from the second and third emission units, respectively, guides the combined beams to the objective lens 33, splits the optical paths of the return beams of the beams focused by the objective beam 33 and reflected at the signal recording surface, i.e., the optical paths of the returning beams having different wavelengths, so that the optical paths match the optical paths of the beams having different wavelengths approaching the signal recording surface.

In other words, the optical-path combining unit 34 includes a splitting surface 34a having a wavelength-dependent optical thin film that reflects the first wavelength beam $B_1$ and transmits the second and third wavelength beams $B_2$ and $B_3$. The splitting surface 34a combines the optical paths of the first to third wavelength beams $B_1$ to $B_3$ approaching the signal recording surface, emits the first wavelength beam $B_1$ reflected at the optical disk 2 in a direction opposite to the direction the first wavelength beam $B_1$ approaching the optical disk is emitted, and emits the second and third wavelength beams $B_2$ and $B_3$ reflected at the optical disk 2 in a direction opposite to the direction the second and third wavelength beams $B_2$ and $B_3$ approaching the optical disk are emitted.

The second and third wavelength beams $B_2$ and $B_3$ approaching the optical disk 2 enter the optical-path combining unit 34 from a focus direction F, which is the optical axis direction of the objective lens 33, whereas the second and third wavelength beams $B_2$ and $B_3$ returning from the optical disk 2 are emitted from the optical-path combining unit 34 in the opposite direction along the focus direction F. The first wavelength beam $B_1$ approaching the optical disk enter the optical-path combining unit 34 from a direction orthogonal to the focus direction F, whereas the first wavelength beam $B_1$ returning from the optical disk 2 is emitted from the optical-path combining unit 34 in the opposite direction orthogonal to the focus direction F.

The optical pickup 3 includes a first polarizing beam splitter 41 that splits the optical path of the first wavelength beam $B_1$ reflected at the signal recording surface of the optical disk 2 from the optical path of the first wavelength beam $B_1$ approaching the optical disk and a first light detector 42 that receives and detects the reflected first wavelength beam $B_1$ split by the first polarizing beam splitter 41.

A first collimating lens 44 and an anamorphic prism 45 are interposed between the first light source unit 31 and the first polarizing beam splitter 41. The first collimating lens 44 changes the divergence angle of the first wavelength beam $B_1$ emitted from the first light source unit 31 so as to obtain a substantially collimated beam is interposed. The anamorphic prism 45 functions as a beam-deforming optical element for enlarging, in a first direction, the cross-sectional shape of the first wavelength beam $B_1$ that has been converted into a substantially collimated beam by the first collimating lens 44.

A first quarter-wave plate 46 that changes the phase difference of the beam transmitted therethrough by a quarter wavelength and a mirror 47 that reflects the beam emitted from the first quarter-wave plate 46 so as to change the optical path and guide the beam to the optical-path combining unit 34 are interposed between the first polarizing beam splitter 41 and the optical-path combining unit 34.

A first focusing lens 48 that focuses the first wavelength beam $B_1$ returned after the optical path is split by the first polarizing beam splitter 41 on the light-receiving surface of the first light detector 42 and a first multi-lens 49 that generates astigmatism so as to obtain a force error signal are interposed between the first polarizing beam splitter 41 and the first light detector 42.

The anamorphic prism 45 emits the beam after enlarging the diameter of the circular cross-section in the first direction of the beam substantially collimated at the first collimating lens 44, i.e., changing the cross-sectional shape of the beam to an oval. In other words, the anamorphic prism 45 functions as beam shaping unit for shaping the cross-sectional shape of the beam that enters an aperture limiting unit 37 disposed in front of the optical-path combining unit 34 into an oval with the major axis in the focus direction F. The aperture limiting unit 37 is interposed between the mirror 47 and the optical-path combining unit 34 and limits an aperture so as to match the numerical aperture of the transmitted beam to the format of the optical disk 2. For example, the aperture is limited by setting the numerical aperture NA of the first wavelength beam $B_1$ to 0.85. The anamorphic prism 45 and the aperture limiting unit 37 can set the light intensity and the spot shape of the first wavelength beam $B_1$ guided to the optical-path combining unit 34 and the objective lens 33 when the optical-path combining unit 34 and the objective lens 33 are displaced in the focus direction F as described below. In other words, the light intensity and the spot shape can be set constant by using the anamorphic prism 45 to change the cross-sectional shape of the first wavelength beam $B_1$ to an oval with the major axis in the focus direction F and by guiding a predetermined part of the oval-shaped beam to the optical-path combining unit 34 by the aperture limiting unit 37 that is moved in the focus direction F together with the optical-path combining unit 34 as described below.

The first polarizing beam splitter 41 includes a splitting surface 41a including an optical thin film having a polarization characteristics in which, for example, P-polarized beams are transmitted and S-polarized beams are reflected. The first polarizing beam splitter 41 transmits a P-polarized component of the first wavelength beam $B_1$ approaching the optical disk and guides the P-polarized component to the first quarter-wave plate 46, whereas the first polarizing beam splitter 41 reflects the S-polarized return beam of the first wavelength beam $B_1$ and guides the S-polarized beam to the first focusing lens 48.

The first quarter-wave plate 46 changes the phase difference of the P-polarized first wavelength beam $B_1$ that has been transmitted through the first polarizing beam splitter 41 by a quarter wavelength, circularly-polarizes the beam, and emits the beam to the mirror 47. The first quarter-wave plate 46 also changes the phase difference of the returning first wavelength beam $B_1$ that has been reflected at the signal recording surface of the optical disk 2 and transmitted through the objective lens 33, the optical-path combining unit 34, and the mirror 47 by a quarter wavelength so as to obtain an S-polarized beam and emits the S-polarized beam to the first polarizing beam splitter 41.

As described above, the first light source unit 31, the first collimating lens 44, the anamorphic prism 45, the first polarizing beam splitter 41, the first quarter-wave plate 46, the mirror 47, the first focusing lens 48, the first multi-lens 49, and the first light detector 42 constitute a first optical system 40 that guides the first wavelength beam $B_1$ to the optical-path combining unit 34 and guides the return beam from the signal recording surface to the first light detector 42.

The optical pickup 3 includes a second polarizing beam splitter 51 that splits off the optical path of the returning second and third wavelength beams $B_2$ and $B_3$ reflected at the signal recording surface of the optical disk 2 from the optical path of the second and third wavelength beams $B_2$ and $B_3$ approaching the optical disk and a second light detector 52 that receives the returning second and third wavelength beams $B_2$ and $B_3$ split by the second polarizing beam splitter 51.

A second collimating lens 54 that changes the divergence angle of the second and third wavelength beams $B_2$ and $B_3$ emitted from the second light source unit 32 so as to obtain substantially collimated beams is interposed between the second light source unit 32 and the second polarizing beam splitter 51.

A second quarter-wave plate 56 that changes the phase difference of the transmitted beam by a quarter wavelength is interposed between the second polarizing beam splitter 51 and the optical-path combining unit 34.

A second focusing lens 58 that focuses the second and third wavelength beams $B_2$ and $B_3$ returned after the optical path is split by the second polarizing beam splitter 51 on the light-receiving surface of the second light detector 52 and a second multi-lens 59 that generates astigmatism so as to obtain a force error signal are interposed between the second polarizing beam splitter 51 and the second light detector 52.

The second polarizing beam splitter 51 includes a splitting surface 51a including an optical thin film having a polarization characteristics such that, for example, P-polarized beams are transmitted and S-polarized beams are reflected. The second polarizing beam splitter 51 transmits P-polarized components of the second and third wavelength beams $B_2$ and $B_3$ approaching the optical disk and guides the P-polarized components to the second quarter-wave plate 56, whereas the second polarizing beam splitter 51 reflects the S-polarized return beams of the second and third wavelength beams $B_2$ and $B_3$ and guides the S-polarized beams to the second focusing lens 58.

The second quarter-wave plate 56 changes the phase difference of the P-polarized second and third wavelength beams $B_2$ and $B_3$ that have been transmitted through the second polarizing beam splitter 51 by a quarter-wavelength, circularly-polarizes the beams, and emits the beams to the aberration correcting unit 35. The second quarter-wave plate 56 also changes the phase difference of the returning second and third wavelength beams $B_2$ and $B_3$ that have been reflected at the signal recording surface of the optical disk 2 and transmitted through the objective lens 33, the optical-path combining unit 34, and the aberration correcting unit 35 by a quarter wavelength so as to obtain S-polarized beams and emits the S-polarized beams to the second polarizing beam splitter 51.

As described above, the second light source unit 32, the second collimating lens 54, the second polarizing beam splitter 51, the second quarter-wave plate 56, the second focusing lens 58, the second multi-lens 59, and the second light detector 52 constitute a second optical system 50 that guides the second and third wavelength beams $B_2$ and $B_3$ to the optical-path combining unit 34 and the aberration correcting unit 35 provided in front of the optical-path combining unit 34 and guides the return beam from the signal recording surface to the second light detector 52.

Figure 3:
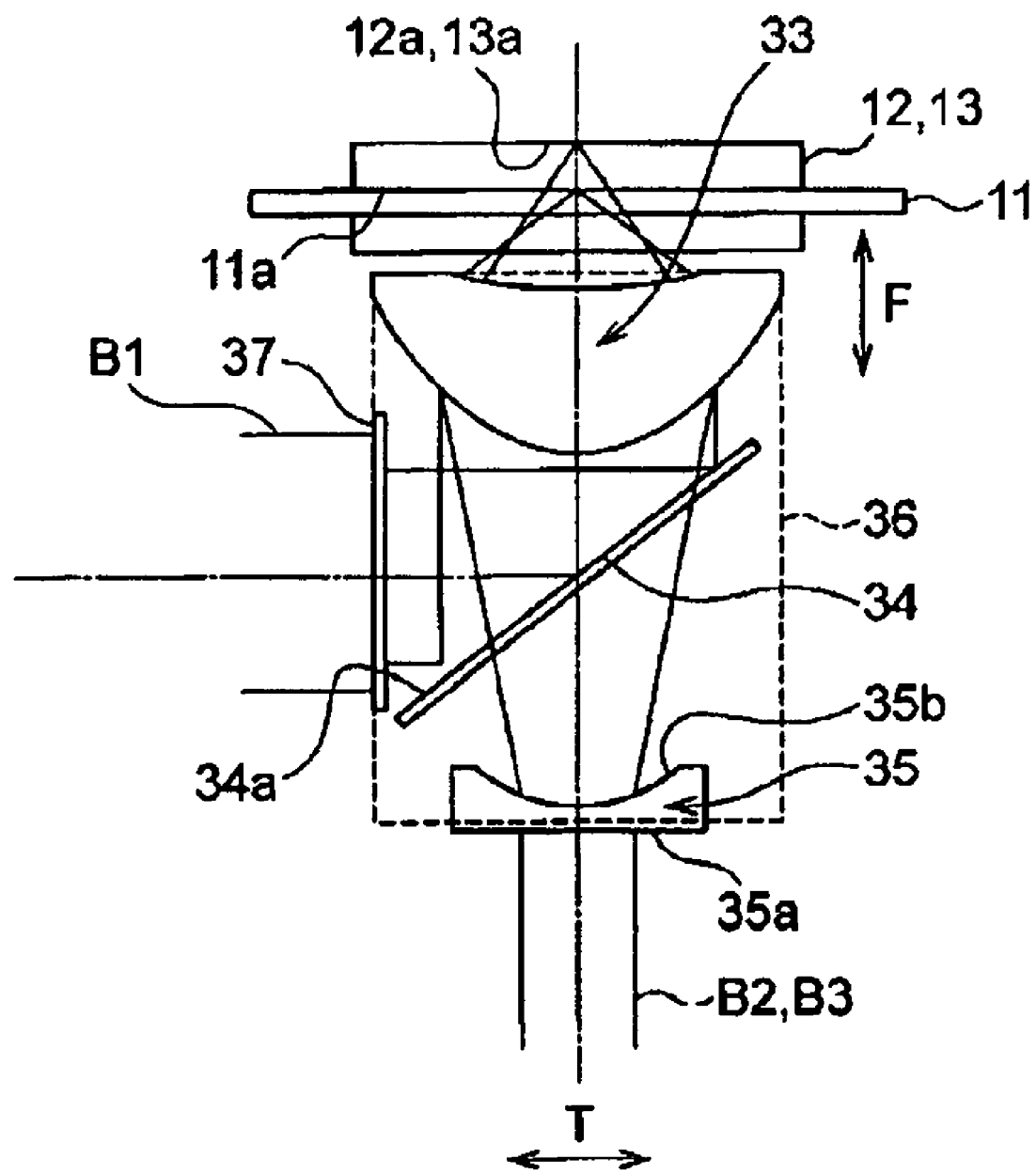
FIG. 3 illustrates an objective lens, an optical-path combining unit, a aberration correcting unit, a driving unit for driving these components, all being included in an optical pickup according to an embodiment of the present invention.

The objective lens 33 focuses the incident first to third wavelength beams $B_1$ to $B_3$ at the signal recording surface of the optical disk 2. As shown in FIG. 3, the objective lens 33 is movably supported by a two-axis actuator 36 that functions as driving unit. The objective lens 33 is moved by the two-axis actuator 36 on the basis of a tracking error signal and a focus error signal generated by detecting the return beam from the optical disk 2 detected by the first or second light detector 42 or 52. In this way, the objective lens 33 moves in two axial directions, i.e., the focus direction F, which is the direction moving toward and away from the optical disk 2, and the diameter direction T of the optical disk 2. The objective lens 33 focuses the beam emitted from any of the first to third emission units so that the beam is always focused at the signal recording surface of the optical disk 2 and moves the focused beam in a manner such that the beam follows the recording tracks formed on the signal recording surface of the optical disk 2. On the two-axis actuator 36 that functions as a driving unit, the optical-path combining unit 34, the aberration correcting unit 35, and the aperture limiting unit 37 are disposed. The optical-path combining unit 34, the aberration correcting unit 35, and the aperture limiting unit 37 are moved together with the objective lens 33.

The objective lens 33 is configured such that aberration is not generated in the first wavelength beam $B_1$. The objective lens 33 includes a first surface $S_1$ on the incident side of the beam approaching the optical disk and a second surface $S_2$ on the side of the optical disk 2. The first and second surfaces $S_1$ and $S_2$ are aspherical. The aspherical shape is represented by the following expression. In Expression 1, $r_i$ represents the radius of curvature, x represents the distance from the optical axis, $A_i$ to $J_i$ represent aspherical coefficients, and $Z_i$ represents the distance in the optical axis direction from a plane orthogonal to the optical axis that is a reference for a position that is a distance h away from the optical axis.

$$Z_i = \frac{r_i^{-1}h^2}{1+\sqrt{1-(1+k_i)r_i^{-2}h^2}} + A_i h^4 + B_i h^6 + \\ C_i h^8 + D_i h^{10} + E_i h^{12} + F_i h^{14} + G_i h^{16} + H_i h^{18} + J_i h^{20} \quad (1)$$

The objective lens 33 focuses the incident collimated first wavelength beam $B_1$ at the signal recording surface 11a of the first optical disk 11. The objective lens 33 focuses the second wavelength beam $B_2$ incident by a predetermined divergence angle at the signal recording surface 12a of the second optical disk 12, as described below. The objective lens 33 also focuses the third wavelength beam $B_3$ incident by a predetermined divergence angle at the signal recording surface 13a of the third optical disk 13, as described below.

The aberration correcting unit 35 is interposed between the second quarter-wave plate 56 and the optical-path combining unit 34 and is a concave lens having a hologram portion 35a, which is a diffracting portion, on the incident side of the second and third wavelength beams $B_2$ and $B_3$ approaching the optical disk. The aberration correcting unit 35 has an aspherical concave lens surface 35b that is formed on a first side of the aberration correcting unit 35 closer to the objective lens 33 and the hologram portion 35a that is provided on a flat surface on a second side of the aberration correcting unit 35. The aberration correcting unit 35 is made of, for example, acrylic resin, such as ZEONEX (trademark). Instead, however, the aberration correcting unit 35 may be made of other materials, such as plastic or glass mold.

Here, the aberration correcting unit 35 is formed as a unit with the aspherical concave lens surface 35b provided on the first side and the hologram portion 35a provided on the second side. Instead, however, the aberration correcting unit 35 may be configured by bonding a hologram element on the flat surface on the second side. Furthermore, the aspherical concave lens and the hologram element may be provided separately.

On the incident side of the aberration correcting unit 35, an aperture limiting unit (not shown) for carrying out aperture limitation to match the numerical aperture of the transmitted beam to the format of the optical disk 2 is provided. For example, this aperture limiting unit sets the numerical aperture NA of the second wavelength beam $B_2$ to 0.6 and the numerical aperture NA of the third wavelength beam $B_3$ to 0.45.

Figure 4:
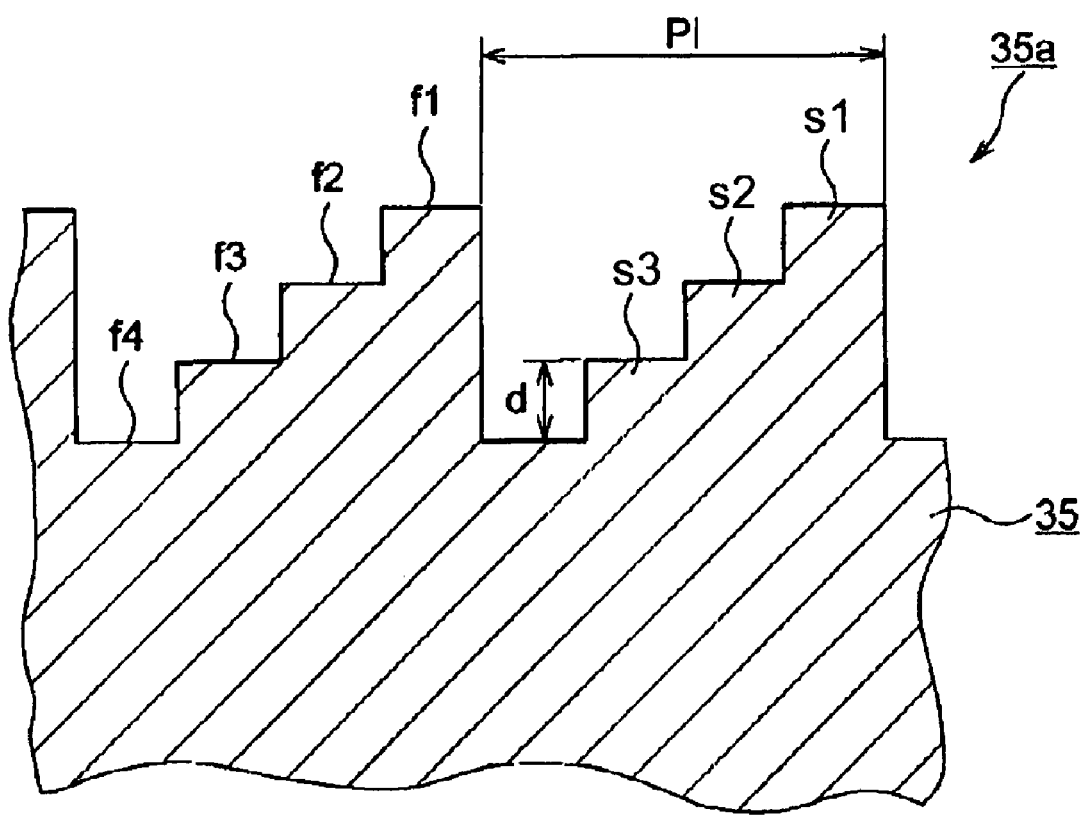
FIG. 4 is a cross-sectional view of a hologram portion of an aberration correcting unit included in an optical pickup according to an embodiment of the present invention.
Figure 5:
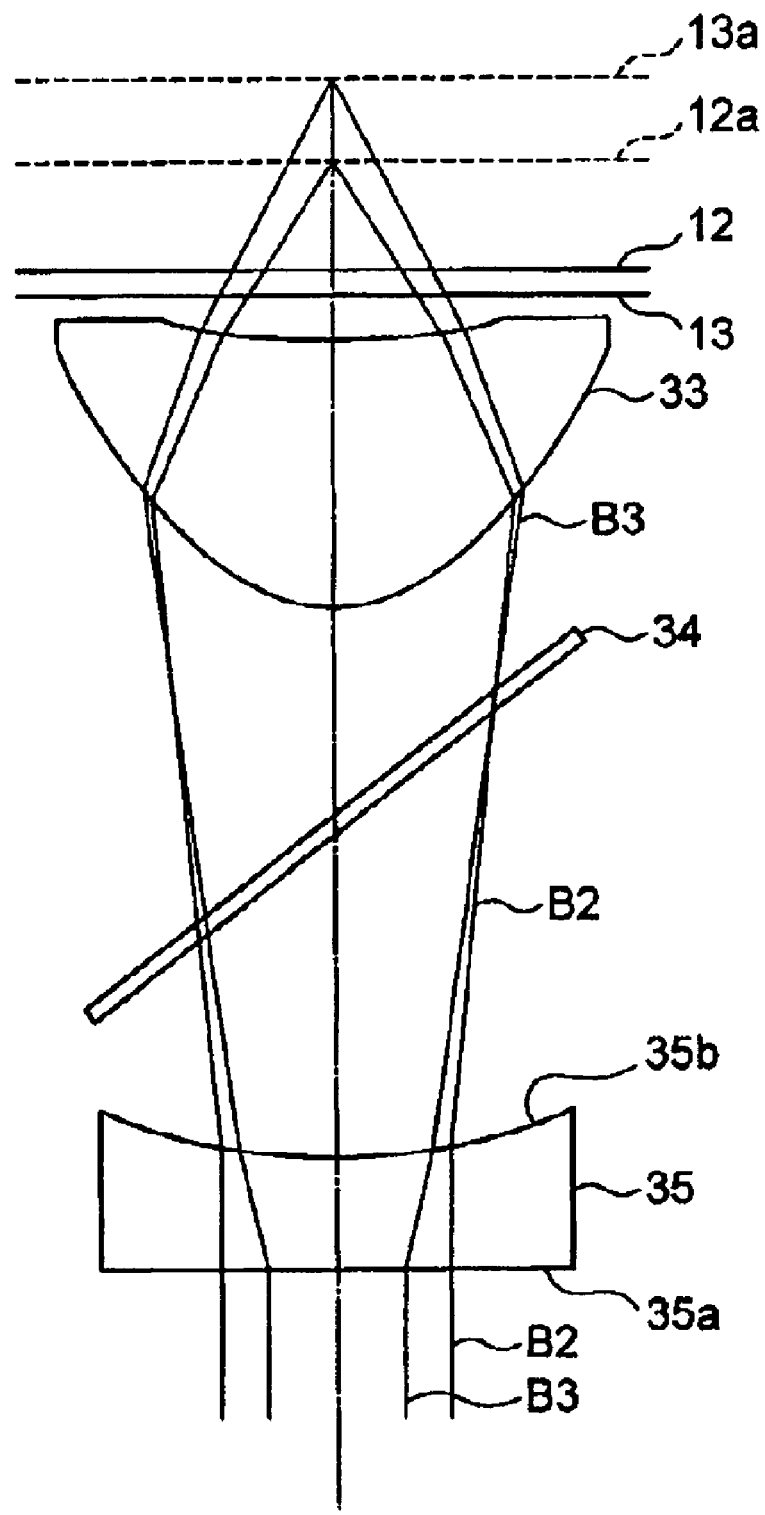
FIG. 5 illustrates second and third wavelength beams whose divergence angles are changed by the aberration correcting unit.

The hologram portion 35a on the incident side of the aberration correcting unit 35 has a cross-section as shown in FIG. 4. As shown in FIG. 5, the aberration correcting unit 35 transmits substantially all of the incident collimated second wavelength beam $B_2$ and diffracts a large amount of the incident collimated third wavelength beam $B_3$ at a predetermined divergence angle.

As shown in FIG. 5, the aspherical concave lens surface 35b on the emission side of the aberration correcting unit 35 refracts the collimated second wavelength beam $B_2$ transmitted through the hologram portion 35a at a predetermined divergence angle and refracts the diverged third wavelength beam $B_3$ diffracted at the hologram portion 35a at a predetermined divergence angle. The aspherical concave lens surface 35b has an aspherical surface. The aspherical surface can be represented by Expression 1, as described above.

By emitting the second and third wavelength beams $B_2$ and $B_3$ at predetermined divergence angles, the aberration correcting unit 35 corrects aberration of the second and third wavelength beams $B_2$ and $B_3$ by using the objective lens 33 that is configured so that aberration is not generated for the first wavelength beam $B_1$, as described above. In other words, the aspherical concave lens surface 35b can eliminate the aberration generated at the signal recording surface of the optical disk 2 by emitting the second wavelength beam $B_2$ to the objective lens 33 after generating an aberration that cancels out the aberration that is generated at the objective lens 33. The hologram portion 35a and the aspherical concave lens surface 35b can eliminate the aberration generated at the signal recording surface of the optical disk 2 by emitting the third wavelength beam $B_3$ to the objective lens 33 after generating an aberration that cancels out the aberration that is generated at the objective lens 33.

Now, the structure of the hologram portion 35a will be described. The hologram portion 35a that functions as a diffracting portion has a step-like shape with a predetermined number of ring-shaped steps having predetermined phase depths.

For example, as shown in FIG. 4, the hologram portion 35a that functions as a diffracting portion is formed as a step-like hologram with four step levels (i.e., a predetermined step number of 4) having first, second, and third step surfaces $s_1$, $s_2$, and $s_3$. In other words, the hologram portion 35a has a step-like hologram having continuous and ring-shaped first, second, third, and fourth optical surfaces $f_1$, $f_2$, $f_3$, and $f_4$.

The optical surfaces $f_1$, $f_2$, $f_3$, and $f_4$ of the hologram portion 35a that are adjacent to each other are disposed at substantially the same distances apart from each other. In other words, the steps $s_1$, $s_2$, and $s_3$ are formed with predetermined level differences such that the second wavelength beam $B_2$ is transmitted and the third wavelength beam $B_3$ is diffracted at a divergence angle that does not generate aberration when the third wavelength beam $B_3$ is focused on the third optical disk 13 by the objective lens 33. Here, level differences d of the optical surfaces are set substantially the same. The optical surfaces $f_1$, $f_2$, $f_3$, and $f_4$ in the first cycle are formed with substantially the same widths in the radial direction. The hologram portion 35a is formed with a predetermined pitch Pi that is the sum of the widths of the optical surfaces $f_1$, $f_2$, $f_3$, and $f_4$ in the radial direction.

Here, a hologram with a step number of 4 including the first to third step surfaces $s_1$, $S_2$, and $s_3$ and the ring-shaped first to fourth optical surfaces $f_1$, $f_2$, $f_3$, and $f_4$ is formed. However, the step number is not limited to 4. In the above, the level differences of the steps and the widths of the optical surfaces in one cycle are all equal. However, the level differences the widths are not limited thereto.

The difference of the optical paths generated by the hologram portion 35a configured as described above is represented by the following Expression 2. In Expression 2, C1 to C5 represent hologram coefficients, h represents the distance from the optical axis, and P(h) represents the optical path difference at a position a distance h away from the optical axis.

$$P(h)=C_1h^2+C_2h^4+C_3h^6+C_4h^8+C_5h^{10} \qquad (2)$$

As described above, the hologram portion 35a employs a diffraction structure formed of a plurality of rings. In this way, the hologram portion 35a transmits substantially the all (approximately 100%) of the second wavelength beam $B_2$ and diffracts a large amount (diffraction rate of approximately 70%) of the third wavelength beam $B_3$ at a predetermined divergence angle. In this way, the transmitted beam of the second wavelength beam $B_2$ and the diffracted beam of the third wavelength beam $B_3$ can be focused through the aspherical concave lens surface 35b and the objective lens 33 on signal recording surfaces 12a and 13a of the second and third optical disks 12 and 13, respectively, without generating aberration.

In other words, the aspherical concave lens surface 35b of the aberration correcting unit 35 is structured so that the second wavelength beam $B_2$ is diffracted at a predetermined divergence angle, so that the third wavelength beam $B_3$, whose divergence angle is changed by passing through the aspherical concave lens surface 35b, is diffracted at a predetermined divergence angle, and so that the second wavelength beam $B_2$ is transmitted through the aspherical concave lens surface 35b. In this way, the divergence angles of the second and third wavelength beams $B_2$ and $B_3$ incident on the objective lens 33 can be set to predetermined divergence angles that do not generate aberration.

In this way, the aberration correcting unit 35 corrects the aberration of the second and third wavelength beams $B_2$ and $B_3$ that are generated by the objective lens 33 configured to prevent the generation of aberration in the first wavelength beam $B_1$, as described above. In other words, the aberration correcting unit 35 generates aberration in the second and third wavelength beams $B_2$ and $B_3$ in a manner such that the aberration generated at the objective lens 33 is canceled out. By emitting these second and third wavelength beams $B_2$ and $B_3$ to the objective lens 33, the aberration generated at the signal recording surface of the optical disk 2 is eliminated.

The first light detector 42 includes a photodetector that receives the return beam of the first wavelength beam $B_1$ and detects an information signal and other various signals, including a tracking error signal and a focus error signal.

The second light detector 52 includes a photodetector that receives the return beam of the second and third wavelength beams $B_2$ and $B_3$ and is capable of detecting information signals and other various signals, such as a tracking error signal and a focus error signal.

The optical pickup 3 configured as described above drives the two-axis actuator 36 to displace the objective lens 33 on the basis of the focus error signals and the tracking error signals detected by the first and second light detectors 42 and 52 so as to focus the beams on the signal recording surface of the optical disk 2 using the objective lens 33 and record or replay information on the optical disk 2.

The optical pickup 3 includes the objective lens 33 configured to not generate aberration by the first wavelength beam $B_1$. The aberration by the second and third wavelength beams $B_2$ and $B_3$ incident on the objective lens 33 is corrected by the aberration correcting unit 35 provided on the optical path so as to allow reading and writing of signals on the plurality of different types of optical disks 11, 12, and 13.

Since the third wavelength beam $B_3$ of the third optical disk 13 having a thick protective substrate layer is incident on the objective lens 33 in a diverged state, the optical pickup 3, at a predetermined working distance WD from the third optical disk 13, can prevent the diameter of the first wavelength beam $B_1$ of the first optical disk 11 having thin protective substrate layer from increasing, and the size of the apparatus can be prevented from increasing.

With the optical pickup 3, since the second and third wavelength beams $B_2$ and $B_3$ are incident on the same objective lens 33 while the aberration correcting unit 35 disposed on the optical path of the second and third wavelength beams $B_2$ and $B_3$ sets the divergence angle, the light intensity of the first to third wavelength beams $B_1$ to $B_3$ is prevented from decreasing, and the light use efficiency can be increased.

The optical pickup 3 according to an embodiment of the present invention uses the same objective lens 33 for three difference wavelengths to maintain a predetermined working distance WD and prevent a reduction in the light intensity. Accordingly, the optical pickup 3 is capable of carrying out recording and/or replay in an excellent manner for a plurality of different types of optical disks having different usable wavelengths.

Therefore, by correcting the aberration by the aberration correcting unit 35 disposed on the optical path of the second and third wavelength beams $B_2$ and $B_3$, the optical pickup 3 according to an embodiment of the present invention is capable of reading and writing signals on a plurality of different types of optical disks 11, 12, and 13 by using beams having different wavelengths emitted from a plurality of emission units provided at the first and second light source units 31 and 32. In addition, since the optical pickup 3 is capable of using the same objective lens 33 and the same common driving unit, the structure is simplified and the size of the apparatus is reduced. Accordingly, high production rate, mass production, and a reduced cost can be achieved.

With the optical pickup 3, since the aberration correcting unit 35 is disposed on the two-axis actuator 36 that is a driving unit for driving the objective lens 33, as described above, the aberration generated when the second and third wavelength beams $B_2$ and $B_3$ are used can be constantly and sufficiently corrected, regardless of the displacement of the objective lens 33 in the focus direction F. Furthermore, since the anamorphic prism 45 is disposed on the optical path of the first wavelength beam $B_1$ incident, from a direction orthogonal to the focus direction F, on the optical-path combining unit 34 provided on the two-axis actuator 36 that is the driving unit, the optical pickup 3 can prevent the spot shape and the light intensity of the first wavelength beam $B_1$ focused by the objective lens 33 from changing, regardless of the position, in the focus direction F, of the optical-path combining unit 34 that is displaced together with the objective lens 33. In other words, even when the objective lens 33 and the optical-path combining unit 34 are displaced in the focus direction F, the optical pickup 3 is capable of guiding the first wavelength beam $B_1$ with an oval cross-section having the major axis in the focus direction F to the optical-path combining unit 34 and the objective lens 33 with a substantially constant spot shape and light intensity by using the aperture limiting unit 37 disposed before the optical-path combining unit 34.

Next, the optical paths of the optical beams emitted from the first and second light source units 31 and 32 of the optical pickup 3 configured as described above will be described with reference to FIG. 2. First, the optical path for when reading and writing of information is carried out by emitting the first wavelength beam $B_1$ to the first optical disk 11 will be described.

The disk-type determining unit 22 that has determined the optical disk 2 as being the first optical disk 11 emits the first wavelength beam $B_1$ from the first emission unit of the first light source unit 31.

The first wavelength beam $B_1$ emitted from the first light source unit 31 is converted into a collimated beam by changing the divergence angle by the first collimating lens 44. Then, the diameter of the collimated beam in a first direction is expanded by the anamorphic prism 45, i.e., the beam shape is changed into an oval shape. Finally, the beam is incident on the first polarizing beam splitter 41. The P-polarized component of the beam incident on the first polarizing beam splitter 41 is transmitted through the splitting surface 41a and is circularly polarized at the first quarter-wave plate 46. Then, the P-polarized component is reflected at the mirror 47 and is guided to the side of the optical-path combining unit 34 while having an oval cross-section with the major axis in the focus direction F. At this time, the first wavelength beam $B_1$ is incident on the optical-path combining unit 34 from a direction orthogonal to the focus direction F. In FIG. 3, the first wavelength beam $B_1$ is incident on the optical-path combining unit 34 from the radial direction T. However, the incident direction is not limited so long as the beam is incident on the optical-path combining unit 34 from a direction orthogonal to the focus direction F.

The first wavelength beam $B_1$ reflected at the mirror 47 passes through the aperture limiting unit 37 that limits the aperture and that is provided before the optical-path combining means 34. Then, the first wavelength beam $B_1$ is reflected at the splitting surface 34a of the optical-path combining unit 34 and is emitted to the side of the objective lens 33. At this time, the first wavelength beam $B_1$ reflected at the optical-path combining unit 34 is a substantially collimated beam. The first wavelength beam $B_1$ incident on the objective lens 33 is appropriately focused at a signal recording surface 11a of the first optical disk 11 by the objective lens 33.

The beam focused on the first optical disk 11 is reflected at the signal recording surface 11a, transmitted through the objective lens 33, and is reflected to the side of the mirror 47 at the splitting surface 34a of the optical-path combining unit 34.

The return beam of the first wavelength beam $B_1$ guided to the side of the mirror 47 by the optical-path combining unit 34 is reflected at the mirror 47, is S-polarized at the first quarter-wave plate 46, and is incident on the first polarizing beam splitter 41.

The return beam of the first wavelength beam $B_1$ incident on the first polarizing beam splitter 41 is reflected at the splitting surface 41a. Then, the divergence angle of the return beam is changed at the first focusing lens 48. Astigmatism for focus servo is added at the first multi-lens 49 to the return beam. Then, the beam is focused on the photodetector of the first light detector 42 and is detected.

Next, the optical path for when reading and writing of information is carried out by emitting the second wavelength beam $B_2$ to the second optical disk 12 will be described.

The disk-type determining unit 22 that has determined the optical disk 2 being the second optical disk 12 emits the second wavelength beam $B_2$ from the second emission unit of the second light source unit 32.

The second wavelength beam $B_2$ emitted from the second light source unit 32 is converted into a collimated beam by changing the divergence angle by the second collimating lens 54. Then, the collimated beam is incident on the second polarizing beam splitter 51. The P-polarized component of the beam incident on the second polarizing beam splitter 51 is transmitted through the splitting surface 51a and is circularly polarized at the second quarter-wave plate 56. Then, the P-polarized component is incident on the aberration correcting unit 35. At this time, the second wavelength beam $B_2$ is incident on the optical-path combining unit 34 from the focus direction F.

The second wavelength beam $B_2$ incident on the aberration correcting unit 35 is transmitted through the hologram portion 35a provided on the incident side, is converted into a diverged beam at the aspherical concave lens surface 35b provided on the emission side, is transmitted through the splitting surface 34a of the optical-path combining unit 34, and is emitted to the side of the objective lens 33. At this time, the second wavelength beam $B_2$ transmitted through the optical-path combining unit 34 has a predetermined divergence angle that eliminates the aberration generated when the beam is focused on the signal recording surface 12a by the objective lens 33. The second wavelength beam $B_2$ incident on the objective lens 33 is appropriately focused on the signal recording surfaces 12a of the second optical disk 12.

The beam focused on the second optical disk 12 is reflected at the signal recording surfaces 12a, transmitted through the objective lens 33, the splitting surface 34a of the optical-path combining unit 34, and the aberration correcting unit 35, and is guided to the side of the second quarter-wave plate 56.

The return beam of the second wavelength beam $B_2$ incident on the second quarter-wave plate 56 is S-polarized and is incident on the second polarizing beam splitter 51. The return beam of the second wavelength beam $B_2$ incident on the second polarizing beam splitter 51 is reflected at the splitting surface 51a. Then, the divergence angle of the beam is changed by the second focusing lens 58. Astigmatism for focus servo is added at the second multi-lens 59 to the return beam. Then, the beam is focused on the photodetector of the second light detector 52 and is detected.

Next, the optical path for when reading and writing of information is carried out by emitting the third wavelength beam $B_3$ to the third optical disk 13 will be described.

The disk-type determining unit 22 that has determined the optical disk 2 being the third optical disk 13 emits the third wavelength beam $B_3$ from the third emission unit of the second light source unit 32.

The third wavelength beam $B_3$ emitted from the second light source unit 32 is converted into a collimated beam by changing the divergence angle by the second collimating lens 54. Then, the collimated beam is incident on the second polarizing beam splitter 51. The P-polarized component of the beam incident on the second polarizing beam splitter 51 is transmitted through the splitting surface 51a and is circularly polarized at the second quarter-wave plate 56. Then, the P-polarized component is incident on the aberration correcting unit 35. At this time, the third wavelength beam $B_3$ is incident on the optical-path combining unit 34 from the focus direction F.

The third wavelength beam $B_3$ incident on the aberration correcting unit 35 is diffracted at the hologram portion 35a provided on the incident side and is converted into a divergent beam. Then, the divergent angle of the divergent beam is changed at the aspherical concave lens surface 35b provided on the emission side, is transmitted through the splitting surface 34a of the optical-path combining means 34, and is emitted to the side of the objective lens 33. At this time, the third wavelength beam $B_3$ transmitted through the optical-path combining unit 34 has a predetermined divergence angle that eliminates the aberration generated when the beam is focused on the signal recording surface by the objective lens 33. The third wavelength beam $B_3$ incident on the objective lens 33 is appropriately focused on the signal recording surfaces 13a of the third optical disk 13.

Since the optical beam of the returning beam that is reflected at the signal recording surfaces 13a of the third optical disk 13 is the same as that of the above-described second wavelength beam $B_2$, description thereof is not repeated here.

The optical pickup 3 according to an embodiment of the present invention includes the first and second light source units 31 and 32; the optical-path combining unit 34 that combines the optical path of the first wavelength beam $B_1$ emitted from the first light source unit 31 and the optical path of the second and third wavelength beams $B_2$ and $B_3$ emitted from the second light source unit 32 and guides the beams to the same objective lens 33; the objective lens 33 that is constituted not to generate aberration to the first wavelength beam $B_1$; and the aberration correcting unit 35 that is interposed between the second light source unit 32 and the optical-path combining unit 34, i.e., on the optical path of the second and third wavelength beams $B_2$ and $B_3$, and that corrects the aberration of the second and third wavelength beams $B_2$ and $B_3$. In this way, the same objective lens can be used for three different wavelengths to read or write an information signal on a plurality of different optical disks. In addition, the predetermined working distance WD is maintained and a reduction in light intensity is prevented. In this way, not only replay, but also recording is possible, and an excellent recording and replay characteristic is obtained.

The optical pickup 3 according to an embodiment of the present invention supports three wavelengths and, at the same time, maintains the working distance WD and prevents a reduction in light intensity. In addition, since the same objective lens and driving components can be used, the structure can be simplified and the size can be reduced. In this way, high productivity and low cost are achieved.

The optical disk apparatus according to an embodiment of the present invention includes the above-described optical pickup 3. In this way, by using the same objective lens that supports three different wavelengths, the working distance WD can be maintained and reduction in light intensity can be prevented. In addition, excellent recording and/or replay can be carried out. Furthermore, the structure can be simplified and the size can be reduced. In this way, high productivity and low cost are achieved.

EXAMPLE

The objective lens 33 and the aberration correcting unit 35 included in the optical pickup 3 according to an embodiment of the present invention will be described in detail below with reference to FIGS. 6 and 7 and the numerical data shown in Tables 1 to 3.

Figure 6:
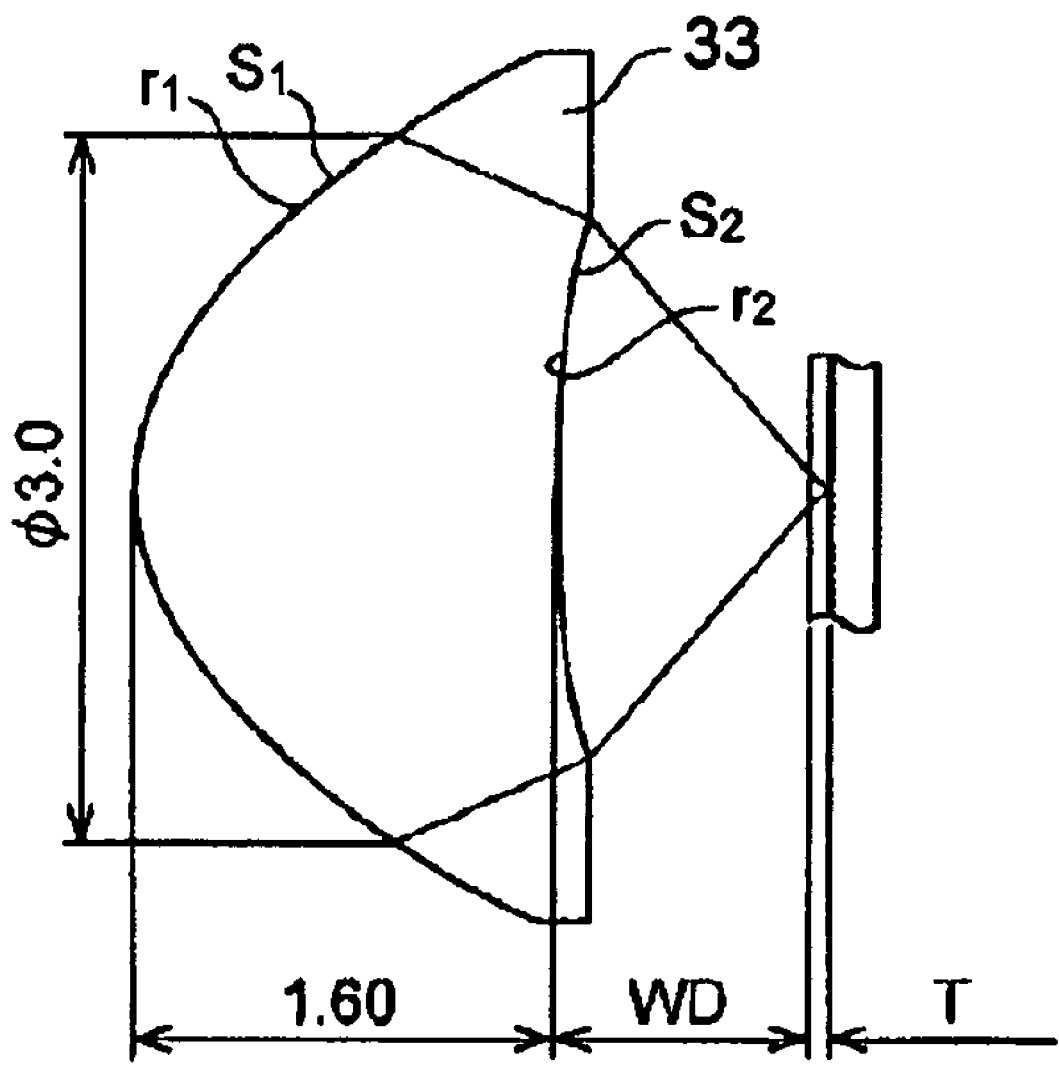
FIG. 6 is a cross-sectional view of an objective lens included in an optical pickup according to an embodiment of the present invention.

Table 1 shows the aspherical coefficients representing the aspherical shape of the first surface $S_1$ of the objective lens 33 on the optical-path combining unit 34 side and the second surface $S_2$ on the optical disk side, as shown in FIG. 6, and represents various conditions corresponding to the above-described Expression 1.

TABLE 1

|   | S1 | S2 |
|---|---|---|
| r | 1.33737 | 6.48654 |
| k | −0.38627 | −16.5297 |
| A | −3.5645E−03 | −4.6689E−02 |
| B | 2.6174E−03 | 3.5462E−01 |
| C | −1.1319E−02 | −1.1835E+00 |
| D | 1.9685E−02 | 1.6808E+00 |
| E | −1.6661E−02 | −5.7116E−01 |
| F | 3.1738E−03 | −1.2688E+00 |
| G | 2.6161E−03 | 1.7314E+00 |
| H | −1.4267E−03 | −8.6942E−01 |
| J | 1.9881E−04 | 1.6234E−01 |

The index of refraction $N_2$ of the objective lens 33 differs depending on the wavelength; the index of refraction $N_{21}$ for the first wavelength (405 nm) is 1.83664; the index of refraction $N_{22}$ for the second wavelength (660 nm) is 1.79597; and the index of refraction $N_{23}$ for the third wavelength (785 nm) is 1.78899. The distance between the surfaces $S_1$ and $S_2$ of the objective lens 33 on the optical path is 1.6 mm, and the aperture diameter corresponding to the first wavelength beam $B_1$ is 3.0 mm.

The index of refraction $N_3$ of the first to third optical disks 11 to 13 is the same value for the first to third wavelengths and is 1.533.

For the protective substrate layer thicknesses T of the first to third optical disks, the protective substrate layer thickness $T_1$ of the first optical disk 11 is 0.1 mm; the protective substrate layer thickness $T_2$ of the second optical disk 12 is 0.6 mm; and the protective substrate layer thickness T3 of the third optical disk 13 is 1.2 mm.

Table 2 shows the hologram coefficient of the hologram portion 35a of the aberration correcting unit 35 and represents various conditions corresponding to the above-described Expression 2. Table 3 shows the aspherical coefficients representing the aspherical shape of the aspherical concave lens surface 35b of the aberration correcting unit 35 and represents various conditions corresponding to the above-described Expression 1. Here, in the case of the aspherical concave lens surface 35b, F to J in Expression 1 equal zero.

TABLE 2

|   | Hologram Coefficient |
|---|---|
| C1 | 5.0523E−02 |
| C2 | 2.7613E−02 |
| C3 | −8.6890E−02 |
| C4 | 3.5380E−01 |
| C5 | −4.0252E−01 |

TABLE 3

|   | Aspherical Coefficient |
|---|---|
| r | 91.911 |
| k | 1.2780E+03 |
| A | −2.2227E−03 |
| B | −6.1512E−03 |
| C | 6.3856E−03 |
| D | −3.9432E−03 |
| E | 9.1075E−04 |

As shown in the above-described FIG. 4, the hologram portion 35a of the aberration correcting unit 35 is formed with four steps (i.e., a predetermined step number of 4). The step level difference d is 1.3 μm, and the total difference of the step levels, i.e., the distance between a first optical surface $f_1$ and a fourth optical surface $f_4$ is 3.9 μm. The minimum pitch is approximately 20 μm, and a sufficient space is provided.

The diffraction efficiency of when the second and third wavelength beams $B_2$ and $B_3$ pass through the aberration correcting unit 35 configured as described above is shown in FIG. 7. In other words, FIG. 7 shows the intensity of the diffracted beam of each diffraction order when the phase depth P(x) of the steps change, i.e., the diffraction beam intensity. In FIG. 7, the solid line $L_0$ represents the change in the intensity at the phase depth of a zero (0) order diffraction beam; the single-dashed chain lines $L_{11}$ and $L_{12}$ represent the change in the intensity at the phase depth of a positive first (+1) order diffraction beam and a negative first (−1) order diffraction beam, respectively; and a double-dashed chain line represents the change in the intensity at the phase depth of a positive/negative second (±2) order diffraction beam.

Figure 7:
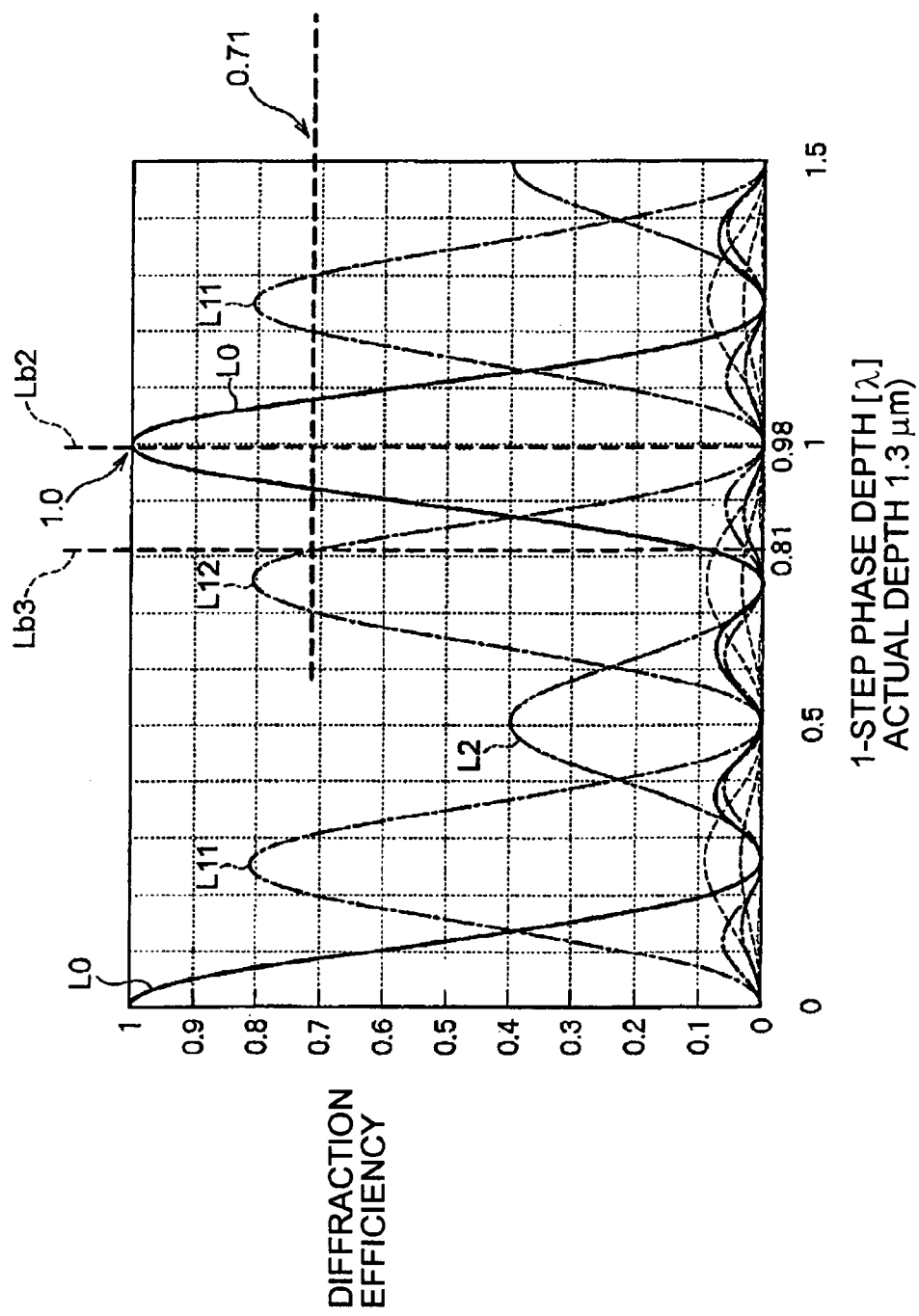
FIG. 7 illustrates the intensity of diffracted beams of different diffraction orders for transmitted beam, depending on the change in the phase depth of a hologram portion provided in the aberration correcting unit.

In FIG. 7, the dotted lines $L_{b2}$ and $L_{b3}$ determine the intensity of the second and third wavelength beams $B_2$ and $B_3$. In other words, when the actual depth d is 1.3 μm, the phase depth is 0.98λ for the second wavelength beam $B_2$ (660 nm). As represented by the dotted line $L_{b2}$, the zero order beam is transmitted by 100%, whereas, as represented by the dotted line $L_{b3}$, the phase depth is 0.81λ for the third wavelength beam $B_3$ (785 nm) and 71% or more of the first order beam is diffracted. Therefore, by using the second and third wavelength beams $B_2$ and $B_3$ that have different wavelengths, the beams can be used extremely efficiently and sufficient light intensity for recording and replay can be obtained.

The phase depths of the second and third wavelength beams $B_2$ and $B_3$ are calculated by Expression 3 presented below. In Expression 3, d represents the depth of one step and equals 1.3 μm, as described above. Nw represents the index of refraction of the hologram portion 35a; Nw equals 1.497 for the second wavelength beam $B_2$ (660 nm) and equals 1.487 for the third wavelength beam $B_3$ (785 nm); and λ represents the wavelength of the incident beam.

$$P = d \times (Nw - 1)/\lambda \quad (3)$$

For the working distances WD according to this example, a working distance $WD_1$ of the first optical disk 11 is 0.74; a working distance $WD_2$ of the second optical disk 12 is 0.53; and a working distance $WD_3$ of the third optical disk 13 is 0.41. In this way, the working distance WD for all optical disks can be maintained at 0.3 mm or more. Thus, even when wobbling of the optical disk occurs during rotation or when a projection is present on the outer circumference of the optical disk, the optical disk and the objective lens can be prevented from colliding into each other.

By emitting the collimated first wavelength beam $B_1$ to the objective lens 33 and emitting the second and third wavelength beams $B_2$ and $B_3$ to the objective lens 33 at a predetermined divergence angle, the beams can be focused at the signal recording surface of each optical disk while reducing aberration. Moreover, by using the second and third wavelength beams $B_2$ and $B_3$ transmitted through the aberration correcting unit 35 at high diffraction efficiency, reduction in the light intensity can be prevented.

Thus, the optical pickup uses the same objective lens supporting three different wavelengths and can maintain the working distance WD and prevent a reduction in the light intensity. In this way, excellent recording and replay can be carried out.

More specifically, the optical pickup uses beams having different wavelengths to read or write signals on a plurality of different optical disks and uses the same objective lens. In this way, the structure of the optical pickup can be simplified, and the size of the optical pickup can be reduced. Thus, high productivity and low cost is achieved.

It should be understood by those skilled in the art that various modifications, combinations, sub-combinations and alterations may occur depending on design requirements and other factors insofar as they are within the scope of the appended claims or the equivalents thereof.

What is claimed is:

1. An optical pickup comprising:
   a first emission unit configured to emit a first wavelength beam;
   a second emission unit configured to emit a second wavelength beam;
   a third emission unit configured to emit a third wavelength beam;
   an objective lens configured to focus the first, second, and third wavelength beams emitted from the first, second, and third emission units, respectively, at a signal recording surface of an optical disk;
   a light-path combining unit configured to combine an optical path of the first wavelength beam emitted from the first emission unit and an optical path of the second and third wavelength beams emitted from the second and third emission units, respectively; and
   an aberration correcting unit provided on the optical path of the second and third wavelength beams; and
   a driving unit configured to displace the objective lens, the optical-path combining unit, and the aberration correcting unit in at least a focus direction.

2. The optical pickup according to claim 1, wherein the aberration correcting unit includes a hologram portion on a first surface of an aspherical concave lens.

3. The optical pickup according to claim 2, further comprising:
   a beam-deforming unit configured to change a cross-sectional shape of a transmitted beam into an oval, the beam-deforming unit being disposed on the optical path of the first wavelength beam.

4. The optical pickup according to claim 3,
   wherein the second and third wavelength beams are incident on the optical-path combining unit from the focus direction and is guided to the objective lens after being transmitted through the optical-path combining unit,
   wherein the first wavelength beam is incident on the optical-path combining unit from a direction substantially orthogonal to the focus direction and is guided to the objective lens after being reflected at the optical-path combining unit, and
   wherein the beam-deforming unit changes the cross-sectional shape of the first wavelength beam into an oval in which the major axis is in the focus direction when the first wavelength beam is incident on the optical-path combining unit.

5. The optical pickup according to claim 1, wherein,
   the first wavelength beam has a first wavelength of approximately 405 nm,
   the second wavelength beam has a second wavelength of approximately 660 nm, and
   the third wavelength beam has a third wavelength of approximately 785 nm.

* * * * *

UNITED STATES PATENT AND TRADEMARK OFFICE
CERTIFICATE OF CORRECTION

PATENT NO. : 7,675,833 B2
APPLICATION NO. : 11/732448
DATED : March 9, 2010
INVENTOR(S) : Satoshi Hineno It is certified that error appears in the above-identified patent and that said Letters Patent is hereby corrected as shown below:

Title Page, Item (54) Title should read as follows:

OPTICAL PICKUP WITH BEAM GENERATING AND FOCUSING

Signed and Sealed this

Thirteenth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,675,833 B2  Page 1 of 1
APPLICATION NO. : 11/732448
DATED : March 9, 2010
INVENTOR(S) : Satoshi Hineno It is certified that error appears in the above-identified patent and that said Letters Patent is hereby corrected as shown below:

Title Page, Item (54) and at Column 1, lines 1 and 2, Title should read as follows:

\*\* OPTICAL PICKUP WITH BEAM GENERATING AND FOCUSING \*\*

This certificate supersedes the Certificate of Correction issued April 13, 2010.

Signed and Sealed this

Thirteenth Day of July, 2010

David J. Kappos
*Director of the United States Patent and Trademark Office*